United States Patent [19]

Seidner et al.

[11] Patent Number: 5,526,071
[45] Date of Patent: Jun. 11, 1996

[54] MULTIFOCAL CONTACT LENS AND METHOD FOR PREPARING

[75] Inventors: Leonard Seidner, Manalapan, N.J.; Maurice Poster, Jericho, N.Y.

[73] Assignee: Permeable Technologies, Inc., Morganville, N.J.

[21] Appl. No.: 201,699

[22] Filed: Feb. 25, 1994

Related U.S. Application Data

[63] Continuation-in-part of Ser. No. 40,422, Mar. 31, 1993, Pat. No. 5,404,183, and a continuation-in-part of Ser. No. 111,845, Aug. 25, 1993.

[51] Int. Cl.$^6$ ........................................ G02C 7/04
[52] U.S. Cl. ................................ 351/161; 351/177
[58] Field of Search ........................ 351/160 R, 160 H, 351/161, 162, 177

[56] References Cited

U.S. PATENT DOCUMENTS

| | | | |
|---|---|---|---|
| 3,482,906 | 12/1969 | Volk | 351/161 |
| 4,418,991 | 12/1983 | Breger | 351/161 |
| 4,525,043 | 6/1985 | Bronstein | 351/161 |
| 4,636,049 | 1/1987 | Blaker | 351/161 |
| 4,640,595 | 2/1987 | Volk | 351/161 |
| 4,752,123 | 6/1988 | Blaker | 351/161 |
| 4,765,728 | 8/1988 | Porat et al. | 351/161 |
| 4,883,350 | 11/1989 | Muckenhirn | 351/161 |
| 4,890,912 | 1/1990 | Visser | 351/161 |
| 4,936,672 | 6/1990 | Capez | 351/161 |
| 4,971,432 | 11/1990 | Koeniger | 351/161 |
| 5,181,053 | 1/1993 | Brown | 351/161 |

*Primary Examiner*—Scott J. Sugarman
*Attorney, Agent, or Firm*—R. Neil Sudol; Henry D. Coleman

[57] ABSTRACT

A hydrophilic multifocal contact lens customized for a patient comprises, in accordance with the present invention, (i) an anterior surface having at least two annular aspheric surfaces, each of said annular aspheric surfaces having standard eccentricity values ranging from about 0.4 to about 1.8, said surfaces differing in eccentricity value from about 0.2 to about 0.8, (ii) a concave posterior cornea-fitting surface having at least one spherical or aspheric surface, and optionally, (iii) an edge radius at the annular periphery of said posterior surface.

24 Claims, 2 Drawing Sheets

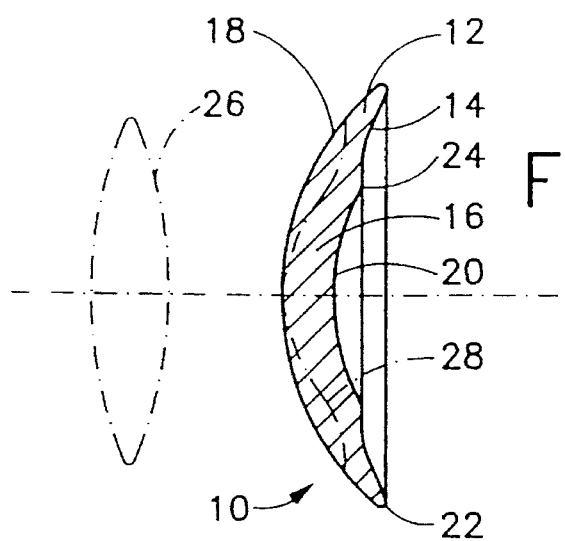
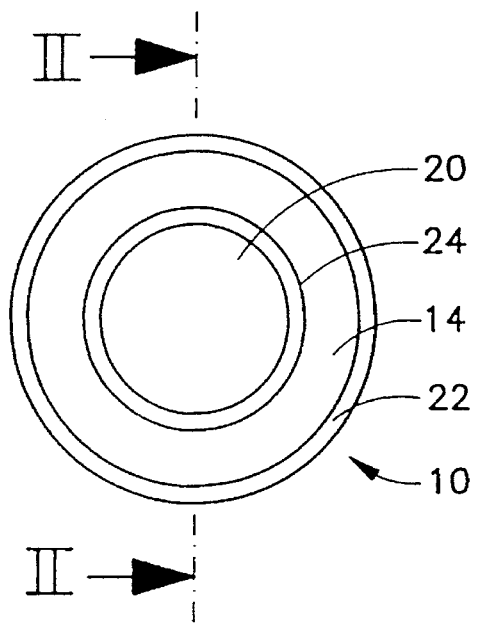
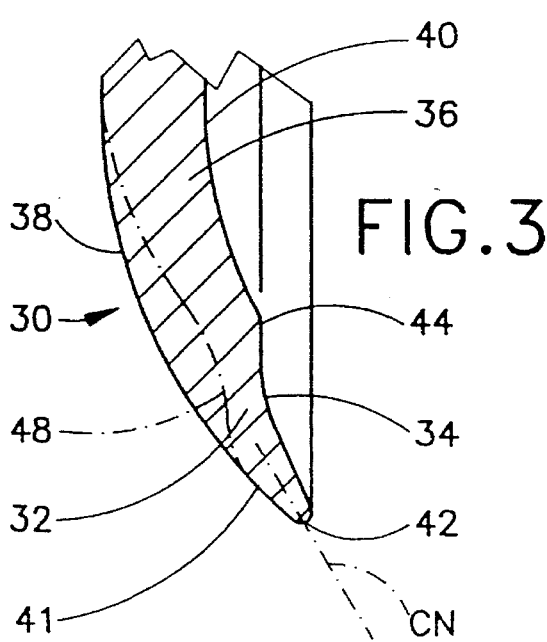
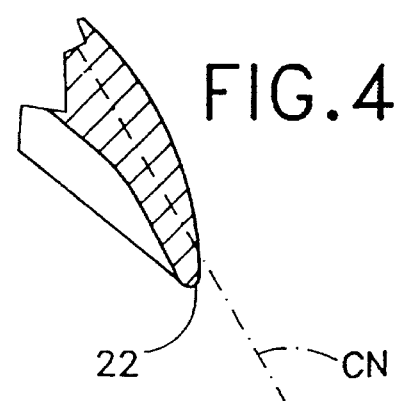

1

MULTIFOCAL CONTACT LENS AND METHOD FOR PREPARING

CROSS-REFERENCE TO RELATED APPLICATIONS

This application is a continuation-in-part of application Ser. No. 040,422 filed Mar. 31, 1993 now U.S. Pat. No. 5,404,183 and a continuation-in-part of application Ser. No. 111,845, filed Aug. 25, 1993.

BACKGROUND OF THE INVENTION

This invention relates to a multifocal hydrophilic ("soft") or rigid gas permeable (RGP) contact lens and method of use in preparing and fitting a customized multifocal contact lens. This invention also relates to a multifocal contact lens (hydrophilic or RGP) produced using such a method.

Bifocal contact lenses are designed to correct or compensate for a condition of advancing age known as "presbyopia." In a presbyopic eye, the ability to focus at near distances, such as the normal reading distance, and in some cases at great distances, is diminished. The loss of focusing capability is due to hardening of the eye's natural crystalline lens material.

Generally, multifocal contact lenses (usually either bifocal, trifocal or aspheric) are concentric or segmented in configuration. In a conventional bifocal contact lens of the concentric type, a first, centrally located, circular correction zone constitutes either distant or near vision correction, while a second annular correction zone surrounding the first zone provides the corresponding near or distance vision correction, respectively. In a conventional bifocal contact lens of the segmented or translating type, the lens is divided into two somewhat D-shaped zones. Usually the upper area is for distant vision correction, whereas the lower area is for near vision correction. Such conventional segmented contact lenses require some sort of movement of the lens relative to the eye to achieve acceptable visual acuity for both distant and near vision.

One accepted method of fitting contact lenses is based on taking so called K readings (which measure the center of the cornea) and fitting the center of the contact lens in a predetermined relationship to those readings. This, however, is not the only method of fitting contact lenses.

In all conventional bifocal fitting techniques, the bifocal or multifocal contact lenses is optimally designed to be particularly positioned on the cornea. However, it is very difficult in many cases, to position the lens to achieve the required fit. In general, the hardest part of fitting a lens is to position the lens at a desired location on the patient's cornea.

Precise fitting of a bifocal contact lens to the eye is crucial in so called simultaneous vision contact lenses where the brain receives both near and far vision input and selects between the near vision input and the far vision input, depending on the desired object(s) of perception.

As mentioned above, the segmented bifocal contact lenses translate to some extent on the eye. Such lenses cannot be locked onto the cornea. However, for good vision, some stability is necessary.

OBJECTS OF THE INVENTION

An object of the present invention is to provide a method for preparing a multifocal soft or hydrophilic contact lens.

Yet another object of the present invention is to provide such a method which utilizes a standardized diagnostic or fitting lens to produce a prescription for a contact lens having an anterior surface containing at least two concentric aspheric surfaces.

Another, more particular, object of the present invention is to provide such a method which is conceptually simple and easy to implement.

A further object of the present invention is to provide a multifocal contact lens which is not necessarily centered in its normal use position(s) on the eye.

Another particular object of the present invention is to provide such a multifocal contact lens which is made from a polymer material which provides at least about 10% by weight water after hydration.

Yet another object of the present invention is to provide such a lens which has at least one spherical or aspheric posterior surface, or a combination of spherical and asperical surfaces.

These and other objects of the present invention may be gleaned from the drawings and detailed descriptions set forth herein.

SUMMARY OF THE INVENTION

The present invention is directed principally to a method for use in preparing a customized soft or hydrophilic multifocal contact lens wherein a standard diagnostic hydrophilic contact lens having a predetermined refractive power for distance vision is first placed on the patient's eye and allowed to seat itself in a natural position. The hydrophilic lens of the present invention will generally seat itself in a substantially centered position (which term shall include a somewhat off-centered position).

In one step of the method, an over-refraction is performed using the diagnostic lens in its natural position on the patient's cornea to determine an aspheric power curve which may be applied to a first portion or area of a prescription multifocal contact lens to provide optimal distance vision for the patient. In another step, a further over-refraction is performed to determine a second aspheric curve to provide near vision for the patient. Generally, the distance vision area is a central area of the lens, while the near vision area is an annular area in the periphery of the anterior surface of the lens.

The patient is fitted with a lens having the same posterior profile as the diagnostic lens and an anterior profile with two or more concentric or coaxial aspheric surfaces having different eccentricity values-as determined by the results of the over-refraction procedure. In accordance with the present invention, the anterior power curve will comprise a minimum of two and a maximum of four aspheric curves, each having different eccentricity values, to provide adequate vision for near, intermediate and far distances. In certain instances, in order to accommodate near, intermediate and distance vision, the lens preferably will comprise central, paracentral and peripheral aspheric curves, each having a different eccentricity value, on the anterior surface of the lens and a single posterior spherical or aspheric curve of predetermined-eccentricity, or optionally and preferably, a spherical curve combined with an aspheric curve of predetermined eccentricity.

Upon placement of a diagnostic hydrophilic contact lens on the cornea of a patient's eye so that the fitting surface is in substantial alignment with the cornea, the diagnostic lens usually aligns itself with the cornea in a substantially centered position. In this position, using the diagnostic lens having a single aspheric power curve, the patient should have adequate distance vision. With the appropriate diagnostic lens in place, the patient's near vision will be determined. Over-refraction of the lens for near vision will indicate a second aspheric power curve to be cut on the anterior side of this lens. The lens which is produced from this process will often be adequate to provide intermediate vision, in addition to near and distance vision.

Generally, a diagnostic lens used in a fitting method in accordance with the present invention will have a plurality of concentric or coaxial areas with respective predetermined power curves on the anterior side of the lens. However, it is possible for the diagnostic lens to have a single power curve.

A multifocal contact lens fitted in accordance with the present invention will have an anterior side with at least two aspheric power curves having eccentricity values between about 0.4 and about 1.8. A central (inner) area or refractive zone will have a power curve designed for correcting distance vision, while an annular peripheral (outer) refractive zone will have a power curve for correcting near vision. The central area has a radius, in plan view of the lens, between about 1 and 3.5 millimeters, while the annular peripheral near-vision zone has a width between about 2 and 6 millimeters. It is noted that the peripheral part of the anterior side of the contact lens which is outside of the annular peripheral near-vision zone, (outside of the are the patient utilizes for vision) may have any appropriate surface, including an aspheric or spherical surface.

In general, a central anterior aspheric power curve provides distance vision and will have a lower eccentricity value than an optional para-central anterior aspheric power curve which provides intermediate vision. The para-central anterior aspheric power curve will in turn have a lower eccentricity than the peripheral anterior aspheric power curve, which is responsible for near vision. Preferably, the eccentricity value of the central anterior aspheric power curve is between about 0.3 and about 0.8, the para-central anterior aspheric power curve is between about 0.6 and about 1.2 and the peripheral anterior aspheric power curve is between about 0.8 and about 1.6.

To accommodate a patient with a multifocal contact lens in accordance with the present invention, the maximum change in refractive power in a radially outward direction across any single correction zone (plan view) should be no greater than approximately 4 diopters. Thus, the change in refractive power from the center of the lens to the boundary between the central distant-vision correction zone and the first annular correction zone (intermediate vision or near vision) should be no greater than approximately 4 diopters. Similarly, the change in refractive power across the width of an annular correction zone generally should be no greater than approximately 4 diopters. In is to be noted, additionally, that the change in eccentricity from one correction zone to the next should be gradual, to reduce stress on the eye. Thus, in certain instances two aspheric curves may suffice to provide adequate multifocal vision and in other instances, a third or four aspheric surface of varying eccentricity will be used to provide the gradual change between zones to accommodate the patient's vision.

By incorporating the features of the contact lenses according to the present invention, it is now possible to avoid having to fit the patient into a set or established position, thus obviating one of the more difficult problems of bifocal/multifocal contact lens fitting. Instead, in the present invention, the fit or position of the lens is first established naturally and thereafter, the visual characteristics of the lens are designed into the finished lens.

A hydrophilic multifocal contact lens customized for a patient comprises, in accordance with the present invention, (i) an anterior surface having at least two aspheric surfaces, each having a standard eccentricity value between about 0.4 and about 1.8, with the eccentricity values differing by at least about 0.2 and by no more than about 0.8, and (ii) a concave posterior cornea-fitting surface having at least one spherical or aspheric surface.

In certain preferred embodiments according to the present invention, the anterior surface of the hydrophilic contact lens has at least three annular aspheric surfaces, each of the annular aspheric surfaces having a standard eccentricity value ranging from about 0.4 to about 1.8, the surfaces differing in eccentricity value from about 0.2 to about 0.8 and the concave cornea-fitting posterior surface having at least one spherical or aspheric cornea-fitting surface whose eccentricity value ranges from about 0.3 to about 1.0, preferably between about 0.6 and 0.8. In certain preferred embodiments, the anterior surface of the contact lens has an aspheric central power curve, an aspheric para central power curve and an aspheric lenticular power curve, each of the curves having different eccentricities ranging from about 0.4 to about 1.8 and consequently, producing different powers all customized to the patient to produce adequate near, distance and intermediate vision. In certain embodiments according to the present invention, the contact lens according to the present invention may have more than one concave aspheric or spherical posterior cornea-fitting surface.

As set forth above, the anterior surface of the hydrophilic or RGP multifocal contact lens has at least two and preferably from two to four, aspheric surfaces ranging in eccentricity from about 0.4 to about 1.8, preferably about 0.6 to about 1.0, each of the aspheric surfaces differing in eccentricity value within the range of about 0.2 to about 0.8. The posterior cornea-fitting surface of the hydrophilic or RGP multifocal contact lens may have one or more spherical or aspherical surfaces, but preferably, the lens has one aspherical surface ranging in eccentricity from about 0.3 to about 1.0. In certain embodiments according to the instant invention, the posterior cornea-fitting surface of the contact lens may have two annular aspherical surfaces, each of which has an eccentricity value ranging from about 0.3 and about 1.0.

A method for use in preparing a customized multifocal contact lens comprises, in accordance with the present invention, the steps of (a) providing a standard diagnostic hydrophilic or RGP contact lens having an anterior surface and a posterior surface, the anterior surface having one or more aspheric surfaces of predetermined eccentricity, the posterior surface having at least one spherical or aspheric surface of predetermined eccentricity, (b) placing the diagnostic contact lens on the cornea of a patient's eye so that the fitting surface is in substantial contact with the cornea, (c) allowing the diagnostic contact lens to align itself with the cornea in a substantially centered position while the patient looks at an effectively distant object, (d) upon aligning of the diagnostic contact lens in the substantially centered position, disposing a series of test lenses before the patient's eye to determine a central aspheric power curve with which the anterior surface of the contact lens could be formed to provide optimal distance vision for the patient, and (e) while the patient looks at an effectively near object, disposing another series of test lenses before the patient's eye to determine an aspheric power curve with which a peripheral annular portion of the anterior surface of the contact lens could be formed to provide optimal near vision for the patient.

According to another feature of the present invention, the step of providing a standard diagnostic lens includes the step of (f) providing a plurality of standard diagnostic contact lenses each having (i) an anterior surface with at least two aspheric surfaces each having a predetermined eccentricity value between about 0.4 and 1.8, the surfaces differing in eccentricity value by at least about 0.2 and no more than about 0.8 and (ii) a posterior surface having at least one spherical or aspheric surface having an eccentricity value between about 0.3 and about 1.0, and (g) selecting one of the standard diagnostic contact lenses.

According to yet another feature of the present invention, the standard diagnostic lens is a hydrophilic or RGP multifocal contact lens which includes three anterior concentric or coaxial aspheric surfaces each having a predetermined eccentricity value between about 0.4 and 1.8, with the surfaces differing in eccentricity value by at least about 0.2 and by no more than 0.8.

A hydrophilic multifocal contact lens customized for a patient comprises, in accordance with the present invention, (i) an anterior surface having at least two concentric or coaxial aspheric surfaces each having a standard eccentricity value between about 0.4 and about 1.8, the surfaces differing in eccentricity value by at least about 0.2 and nor more than about 0.8, and (ii) a concave posterior cornea-fitting surface having at least one spherical or aspheric surface.

The instant invention recognizes the difficulty of providing adequate multifocal hydrophilic contact lenses. However, instead of struggling to achieve absolute corneal centering, as some fitting techniques attempt, the instant method obviates the difficulty by assuming that the greatest majority of fitted multifocal lenses will be centered or slightly off-centered on the cornea. In a method in accordance with the present invention, the diagnostic lens positions itself in its natural position, which, in hydrophilic lenses, is centered or substantially centered (slightly off-center). Because the finished lens has the same back surface design as the diagnostic lens, there is no need to further position either the diagnostic lens or the finished product, which should naturally position the same way as the diagnostic lens.

The present invention recognizes that each cornea is different and, instead of molding or fitting a lens precisely to center on the eye, the instant contact lens preparation technique selects among a fixed number of prescribed standard fitting or diagnostic lenses and then modifies the anterior surface only in order to achieve an optimal multifocal vision. This method can change differential powers of the two annular anterior aspheric zones without appreciably affecting the fit.

Because the annular surface of the lens manufactured in accordance with the present invention contains annular aspheric surfaces, the lens has a multiplicity of refractive powers. For a given aspheric surface, these powers are least plus or most minus at the vertex and progressively become more plus or less minus from the vertex to the end of the central zone.

Whenever one refracts over such a lens on the eye using spherical ophthalmic lenses, the patient subjectively chooses that ophthalmic lens power combined with the multiplicity of lens powers in the aspheric central zone of the contact lens which provides the best acuity of vision at both far distance and near distance. There is a cortical interpretation of the independent images to determine the best acceptable summation of images.

The present invention may be used with all standard contact lens materials, i.e. rigid (gas permeable or PMMA), but is preferably used with soft (hydrogel) polymeric materials i.e., polymeric materials which contain at least about 10% by weight water after hydration.

BRIEF DESCRIPTION OF THE DRAWING

FIG. 1 is a schematic rear elevational view of a diagnostic contact lens for use in fitting a patient with a simultaneous type multifocal contact lens.

FIG. 2 is a cross-sectional view taken along line II—II in FIG. 1, showing in phantom lines an ophthalmic lens positioned in front of the diagnostic lens for fitting purposes.

FIG. 3 is a partial cross-sectional view of another diagnostic contact lens for use in fitting a patient with a relatively translating type multifocal contact lens.

FIG. 4 is a partial cross-sectional view, on an enlarged scale, of the ophthalmic lens of FIGS. 1 and 2, showing an edge bevel.

DETAILED DESCRIPTION

Figure 5:
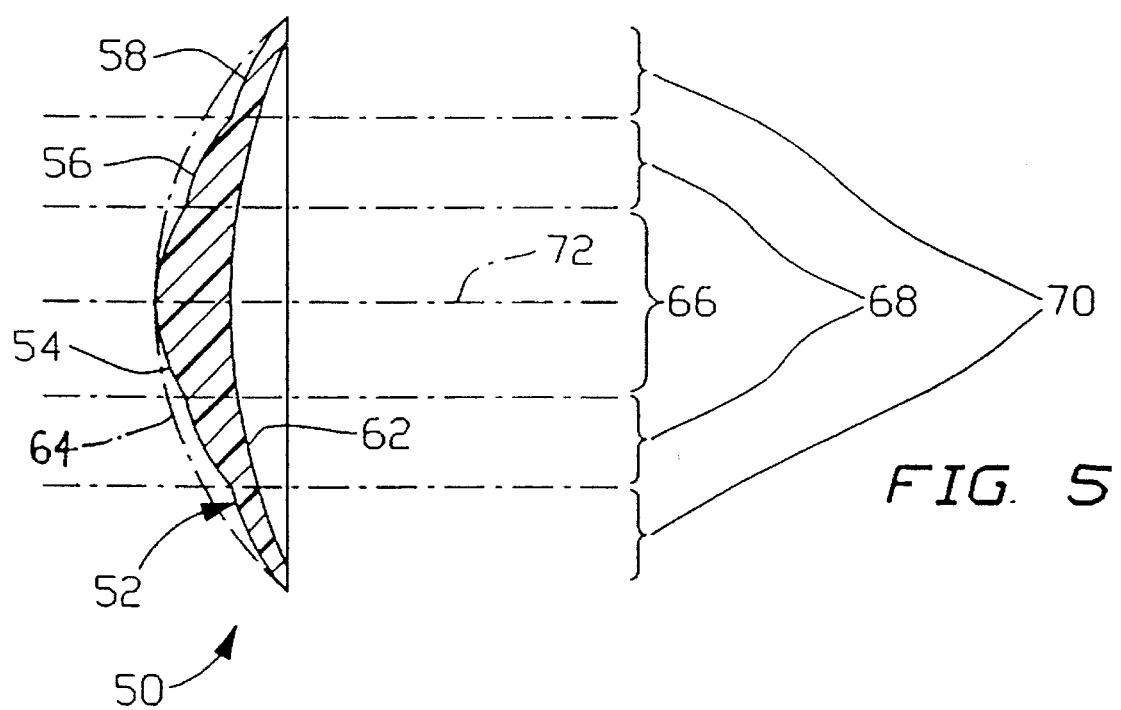
FIG. 5 is a schematic cross-sectional view of a multifocal contact lens in accordance with the present invention derived in a fitting procedure in accordance with the present invention.

In preparing a customized multifocal contact lens, a standard diagnostic contact lens 10 as illustrated in FIGS. 1 and 2 is first placed on the patient's eye and allowed to seat itself in a natural, substantially centered, position. The lens generally contains a single annular aspheric power curve on the anterior surface of the lens and either a spherical or aspheric concave surface on the posterior cornea-fitting surface. If the diagnostic lens does not produce adequate distance vision, an a first over-refraction is performed to determine a first central aspheric power curve for the central annular anterior surface of the lens. This central power curve is responsible for providing distance vision. An additional over-refraction is then performed to determine a second power curve for the peripheral anterior surface of the lens to provide adequate near distance. The second power curve is provided by modifying the anterior surface of a finished prescription lens having the same posterior surface as the diagnostic lens 10. In many instances, the anterior surface of the lens will have only two anterior annular aspheric power curves. In other cases, the anterior surface may have more than two, and preferably three, aspheric power curves.

As shown in FIGS. 1 and 2, a first diagnostic lens 10 tried on the patient has a concave cornea-fitting posterior surface 14. Surface 14 may be spherical or preferably, aspheric with a predetermined eccentricity ranging from about 0.3 to about 1.0. Lens 10 also has a predetermined anterior central annular aspheric surface 12 and an anterior peripheral annular aspheric surface 18, each surface having predetermined eccentricity. Generally, this first diagnostic lens has at an annular periphery of lens 10, an edge radius 22 (FIGS. 2 and 4) which is turned to the side of a center line CN. Accordingly, by virtue of the use of an aspheric surface, surface 14 of the lens is curved down to fit against the cornea of the patient's eye. It is noted that the edge radius is an optional feature of the lens according to the present invention.

In fitting a patient with a multifocal contact lens, diagnostic lens 10 is placed on the cornea of the patient's eye so that cornea-fitting posterior surface 14 is in substantial contact with the cornea. Lens 10 is allowed to align itself with the cornea in a substantially centered position. Upon an alignment of diagnostic contact lens 10 in the substantially centered position, a series of conventional spherical opthalmic test lenses 26 (FIG. 2) are disposed before the lens 10 on the patient's eye to determine a peripheral power curve 28 (FIG. 1) with which anterior central annular aspheric surface 12 of central portion 16 can be formed to provide optimal near and far vision for the patient.

To optimize the fitting of lens 10 to any particular patient's cornea, lens 10 is first selected from a kit of standard diagnostic contact lenses, such as lens 10, each having anterior peripheral annular aspheric surface 18 with concave cornea-fitting posterior surface 14. Each lens 10 also has central portion 16 with predetermined convex anterior surface 18 of predetermined eccentricity between approximately 0.40 and approximately 1.80 and preferably between approximately 0.6 and 1.0.

Most of the lenses 10 in the kit have cornea-fitting posterior surfaces 14 which are aspherical with eccentricities between about 0.3 and about 1.0, preferably about 0.6 to about 0.8. The radii of curvature and eccentricities vary so as to provide the practitioner with adequate flexibility in fitting a lens to a patient's cornea.

The patient is fitted first with a diagnostic or fitting contact lens 10 having a posterior surface 14 which substantially matches the cornea of the patient about the iris. Of course, precise matching is undesirable, because space is required for tear flow, etc.

Two or more different standard diagnostic contact lenses 10 may be tested on the cornea of the patient to determine which has the most appropriate cornea-fitting surface 14 and anterior central annular aspheric surface 12 of central portion 16. Upon the selection of a suitable diagnostic lens 10 which provides adequate distance vision, an over-refraction procedure is performed to determine an appropriate anterior peripheral annular aspheric surface 18 of central portion 16 for the final lens to provide adequate near vision. This over-refraction procedure is performed with the patient focusing on a near object. Upon the determination of an appropriate near vision power curve, the appropriate aspheric curve is formed on the anterior peripheral annular aspheric surface 18 of central portion 16. This lens, once manufactured to the prescription established by the diagnostic procedure should provide adequate near, distance and intermediate vision.

If the above-described procedure is determined to be ineffective in providing the patient with acceptable intermediate vision as well as acceptable near and distance vision, then two alternative procedures are available for providing a prescription lens with acceptable intermediate vision as well as acceptable near and distance vision.

In one procedure, the patient continues to wear the same diagnostic lens or another diagnostic lens 10. A first over-refraction is performed to determine an acceptable power curve for near vision in the anterior peripheral annular aspheric surface 18 of central portion 16. A second over-refraction, on the patient's intermediate vision, is performed to determine a third aspheric curve for a para central portion of the lens 19. Accordingly, a resulting simultaneous-vision-type multifocal contact lens for the patient in need of intermediate vision correction has three aspheric surfaces or power curves on the anterior surface of the lens.

In the other procedure, the surface prescription lens of the patient is provided with an aspheric cornea-fitting posterior surface 14 and, at the annular periphery of posterior surface 14, with a second aspheric power curve 21, to accommodate intermediate vision.

Generally, an aspheric power curve will have an eccentricity ranging from about 0.4 to about 1.8. It is noted that the anterior peripheral annular aspheric surface 18 has a higher eccentricity value than the central convex anterior aspheric surface 18 of central portion 16, with the two aspheric surfaces differing in eccentricity from about 0.2 to about 0.8. This solution gives the patient a greater "add" in a peripheral area of the lens through which the patient looks for near vision. The eccentricity of the peripheral convex anterior aspheric surface 12 is selected to provide the proper "add" determined by over-refracting for distance vision and near vision.

In order to secure acceptable distance vision and near vision in a multi-focal contact lens pursuant to the above-described procedure, particularly where there is a signficant difference in "add" between the prescription or power curve for distance vision and the prescription or power curve for near vision, the lens may be formed to float or translate slightly on the cornea to an extent greater than normal. Thus, in the case of a contact lens having two anterior aspheric surfaces, a steeper part of the power curve may be shifted over the pupil for near vision. In the case of a lens with a third, para central anterior aspheric surface, the slight translation of the lens may serve to shift the lenticular area more squarely over the lens for near vision.

Where a patient is to be fitted with a simultaneous type multifocal contact lens, the eccentricity of anterior peripheral annular aspheric surface 18 of central portion 16 is preferably between approximately 0.3 and 1.0, the eccentricity of paracentral convex anterior aspheric surface 21 is preferably between about 0.6 and 1.2 and the eccentricity of anterior central annular aspheric surface 12 of central portion 16 is between about 0.8 and 1.6. In such a simultaneous type multifocal contact lens, cornea-fitting posterior surface 14 is preferably aspherical with an eccentricity between about 0.4 and about 0.8. The use of eccentricity values within the above-described ranges produces a gradual power change between the aspheric surfaces, thus producing favorable multifocal vision.

Lens 10 additionally has at least one transition junction 24 where the anterior peripheral annular aspheric surface 18 of central portion 16 meets anterior central annular aspheric surface 12 of central portion 16. At the transition junction 24, the radii of curvature of the anterior central annular aspheric surface 12 and the anterior peripheral annular aspheric surface 18 are approximately equal. However, the eccentricities of those aspheric anterior surfaces remain different.

An eccentricity between about 0.30 and about 1.0 for cornea-fitting posterior surface 14 of a diagnostic hydrophilic lens or a finished prescription lens is in accordance with the aspheric topographical characteristics of the human cornea. With such an eccentricity, cornea-fitting posterior surface 14 is fitted relatively tightly to the patient's eye, so that the lens, which may move slightly with eye and eyelid movement, does not move significantly with movement of the upper eyelid.

Upon the completion of the over-refraction process, the patient is fitted with a prescription lens (generally, from a lens production laboratory) which is substantially identical to the finally used diagnostic lens 10. The lens may have two anterior aspheric surfaces, or in the case where intermediate vision is to be accommodated, three (or more) anterior aspheric surfaces. The anterior surface of the selected lens blank is machined or, more specifically, lathed to produce the appropriate anterior aspheric surfaces 28. Alternatively, either the posterior or anterior surface of the lens or the entire lens, including posterior and anterior surfaces, may be molded.

In most cases, over-refraction of the diagnostic lens will provide adequate vision for near, intermediate and far distances. In such a case, a lens having a posterior surface with a single spherical or aspheric curve may be used with good success. In certain instances, it may be advantageous to provide a second aspheric surface on the periphery of the cornea-fitting posterior surface 14, each of the aspheric posterior surfaces ranging in eccentricity from about 0.3 to about 1.0.

By incorporating the features of the contact lenses according to the present invention, it is now possible to avoid having to fit the patient in a rigid set or established position, thus obviating one of the more difficult problems of bifocal/multifocal contact lens fitting. Instead, in the present invention, the fit or position of the lens is first established naturally and thereafter, the visual characteristics of the lens are designed into the finished lens.

Generally, as is well known in the art, if the anterior power curve is decreased by 12 lines for each diopter, the add is 1.0. A decrease of 6 lines for each ½ diopter results in an add of 0.5, while a decrease of 24 lines for each 2 diopters results in an add of 2.0. Similarly, a decrease of 48 lines for each 4 diopters results in an add of 4.0. This rule of thumb is helping in guiding the practitioner to design a lens which can accommodate varying powers of the lens in predetermined distances for maximum fit and visual effectiveness.

As illustrated in FIG. 5, a multifocal hydrophilic contact lens 50 has an anterior surface or side 52 with three concentric or coaxial aspheric surfaces 54, 56, and 58 each formed with a respective power curve having a standard eccentricity value between about 0.4 and about 1.8. The eccentricity values differ from one another by at least about 0.2 and by no more than about 0.8. Lens 50 has a concave cornea-fitting posterior surface 62 which includes at least one aspheric surface having an eccentricity value between about 0.3 and about 1.0, preferably between about 0.6 and 0.8.

Hydrophilic multifocal soft lens 50 may include one or more spherical or aspherical posterior surfaces, but preferably, lens 50 has one aspherical surface 62 ranging in eccentricity from about 0.3 to about 1.0. In certain embodiments according to the instant invention, the posterior cornea-fitting surface of the contact lens may have two annular aspheric surfaces, each of which has an eccentricity value ranging from about 0.3 and about 1.0.

Central aspheric surface or power curve 54 provides distance vision and has a lower eccentricity value than the eccentricity value of para-central aspheric surface or power curve 56 which provides intermediate vision. The eccentricity of para-central aspheric surface or power curve 56 in turn has a lower eccentricity than that of peripheral aspheric surface or power curve 58, which provides a correction for near vision. Preferably, the eccentricity value of central aspheric power curve 54 is between about 0.4 and about 0.8, the eccentricity value of para-central aspheric surface or power curve 56 is between about 0.6 and about 0.8, and the eccentricity value of peripheral aspheric surface or power curve 58 is between about 0.8 and about 1.2.

Aspheric surfaces or power curves 54, 56 and 58 are determined in a fitting method utilizing a diagnostic lens having the same posterior surface 62 as lens 50 and an anterior surface 64 having a predetermined standard refractive power. That refractive power is for distance vision. Alternatively, the diagnostic lens may have a plurality of concentric or coaxial areas with respective predetermined standard refractive powers, e.g., for distance vision and near vision, respectively. The diagnostic lens is selected from a kit of diagnostic lenses with different posterior surfaces 62 and different overall dimensions. The diagnostic lens is selected to conform to the particular shape and dimensions of a patient's cornea.

The diagnostic contact lens is placed on the cornea of a patient's eye so that posterior cornea-fitting surface 62 is in substantial contact with the cornea. The diagnostic contact lens is allowed to align itself with the cornea in a substantially centered position while the patient looks at an effectively distant object. Upon aligning of the diagnostic contact lens in the substantially centered position, a series of test lenses is disposed before the patient's eye in a first over-refraction procedure to determine central aspheric surface or power curve 54 for providing optimal distance vision for the patient. In another over-refraction step, while the patient looks at an effectively near object, another series of test lenses is disposed before the patient's eye to determine aspheric surface or power curve 58 for providing optimal near vision for the patient. In yet another over-refraction step, while the patient looks at an intermediately distanced object, a further series of test lenses is disposed before the patient's eye to determine aspheric surface or power curve 56 for providing optimal intermediate distant vision for the patient.

Anterior aspheric surfaces or power curves 54, 56, and 58 are located in a central correction zone 66, an intermediate annular correction zone 68, and a peripheral annular correction zone 70, respectively. Aspheric surfaces or power curves 54, 56, and 58 are concentric or coaxial with a lens axis 72. It is to be noted that the eccentricity values of surfaces or power curves 54, 56, and 58 differ from one another by no more than about 0.8 in order to provide a smooth transition from one correction zone 66, 68, or 70 to another.

A hydrophilic multifocal contact lens in accordance with the present invention may have only a central correction zone 66 and a peripheral correction zone 70 with associated aspheric surfaces or power curves 54 and 58 for correcting distance vision and near vision, respectively. Alternatively, four aspheric surfaces or power curves may be provided, all ranging in eccentricity from about 0.4 to about 1.8, preferably from about 0.6 to about 1.0, each of the aspheric surfaces differing in eccentricity value within the range of about 0.2 to about 0.8.

To accommodate a patient with a multifocal contact lens in accordance with the present invention, the maximum change in refractive power in a radial direction across any single correction zone (plan view) should be no greater than approximately 4 diopters. Thus, the change in refractive power from axis 72 to the periphery of aspheric surface of power curve 54 (distant-vision correction zone) should be no greater than approximately 4 diopters. Similarly, the change in refractive power in a radial direction across power curve 56 or 58 should be no greater than approximately 4 diopters. It is to be noted, additionally, that the change in eccentricity from aspheric surface or power curve 54 to aspheric surface or power curve 56, as well as the change in eccentricity from aspheric surface or power curve 56 to aspheric surface or power curve 58, should be gradual, to reduce stress on the eye.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A multifocal contact lens customized for a patient, having an anterior side with a power curve defined by at least two substantial concentric or coaxial aspheric surfaces each having a single essentially uniform standard eccentricity value between about 0.4 and about 1.8.

2. The lens defined in claim 1 wherein the eccentricity values of said aspheric surfaces differ from one another by at least approximately 0.2 and by no more than approximately 0.8.

3. The lens defined in claim 1 wherein the eccentricity values of said aspheric surfaces differ from one another by no more than approximately 0.8.

4. The lens defined in claim 3 wherein said aspheric surfaces include a central aspheric surface having a first eccentricity and an annular aspheric surface having a second eccentricity, said first eccentricity being less than said second eccentricity.

5. The lens defined in claim 1, further comprising an aspheric cornea-fitting posterior surface.

6. The lens defined in claim 5 wherein said posterior surface has an eccentricity value ranging from about 0.3 to about 1.0.

7. The lens defined in claim 1 wherein said anterior side has three concentric or coaxial aspheric surfaces each having a standard eccentricity value between about 0.4 and about 1.8.

8. The lens defined in claim 7 wherein the eccentricity values of said aspheric surfaces differ from one another by at least approximately 0.2 and by no more than approximately 0.8.

9. The lens defined in claim 1 wherein said aspheric surfaces include a central aspheric surface having a first eccentricity, a first annular aspheric surface having a second eccentricity greater than said first eccentricity, and a second annular aspheric surface having a third eccentricity greater than said second eccentricity.

10. The lens defined in claim 1 manufactured from a hydrophilic polymer.

11. The lens defined in claim 1 wherein said aspheric surfaces include a central aspheric surface having a first eccentricity and an annular aspheric surface having a second eccentricity, said first eccentricity being less than said second eccentricity.

12. A method for use in preparing a customized multifocal contact lens, comprising the steps of:

providing a standard diagnostic contact lens having a concave cornea-fitting posterior surface, said diagnostic contact lens also having a convex anterior surface with a first test area of a predetermined refractive power and a second test area of a predetermined refractive power, said second test area being concentric or coaxial with respect to said first test area;

placing said diagnostic contact lens on the cornea of a patient's eye so that said posterior surface is in substantial contact with the cornea;

allowing said diagnostic contact lens to align itself with the cornea in a natural position;

upon aligning of said diagnostic contact lens in said natural position, disposing a series of test lenses before the patient's eye to determine a first aspheric power curve having a single first substantially uniform standard eccentricity value with which said first area could be formed to provide optimal far vision for the patient; and while the patient looks at an effectively near object, disposing another series of test lenses before the patient's eye to determine a second aspheric power curve having a single second substantially uniform standard eccentricity value with which said second area could be formed to provide optimal near vision for the patient, said second substantially uniform standard eccentricity value being different from said first substantially uniform standard eccentricity value.

13. The method defined in claim 12 wherein said steps of disposing include the steps of determining said first aspheric power curve and said second aspheric power curve to have eccentricity values each between about 0.4 and about 1.8.

14. The method defined in claim 13 wherein said steps of disposing include the steps of determining the eccentricity values of said first aspheric curve and said second aspheric power curve so that those eccentricity values differ from one another by at least approximately 0.2 and by no more than approximately 0.8.

15. The method defined in claim 14 wherein said first area is a central surface and said second area is an annular area coaxial or concentric with said first area, said steps of disposing include the step of determining the eccentricity of said first aspheric power curve to be less than the eccentricity of said second aspheric power curve.

16. The method defined in claim 12 wherein said posterior surface is aspheric.

17. The method defined in claim 16 wherein said posterior surface has an eccentricity value ranging from about 0.3 to about 1.0.

18. The method defined in claim 12 wherein said second predetermined refractive power is different from said first predetermined refractive power.

19. The method defined in claim 12 wherein said aspheric surfaces include a central aspheric surface having a first eccentricity and an annular aspheric surface having a second eccentricity, said first eccentricity being less than said second eccentricity.

20. The method defined in claim 12 wherein said step of providing a standard diagnostic contact lens includes the steps of:

providing a plurality of standard diagnostic contact lenses each having a concave cornea-fitting posterior surface, said diagnostic contact lenses each having a convex anterior surface with a first test area of a predetermined refractive power and a second test area of a predetermined refractive power, said second test area being concentric or coaxial with respect to said first test area; and selecting one of said standard diagnostic contact lenses.

21. A multifocal contact lens customized for a patient, having an anterior side with a power curve defined by at least a substantial first aspheric surface having a single first substantially uniform standard eccentricity value and a substantial second aspheric surface concentric or coaxial with said first aspheric surface and having a single second substantially uniform standard eccentricity value different from said first substantially uniform standard eccentricity value.

22. The lens defined in claim 21 wherein said first substantially uniform standard eccentricity value and said second substantially uniform standard eccentricity value differ from one another by at least approximately 0.2 and by no more than approximately 0.8.

23. The lens defined in claim 22 wherein said first substantially uniform standard eccentricity value is less than said second substantially uniform standard eccentricity value.

24. The lens defined in claim 21, further comprising an aspheric cornea-fitting posterior surface.

* * * * *